Aug. 20, 1963  K. A. JANSON ETAL  3,101,150
TRACTOR SHOVEL MACHINE ADAPTED TO BE COMBINED WITH
A DETACHABLE CRANE OR PULL SHOVEL UNIT
Filed Dec. 6, 1960  6 Sheets-Sheet 1

INVENTORS
KARL ARVID JANSON
GUNNAR FREDRIK SUNDBERG
BY
ATTORNEY

Aug. 20, 1963 K. A. JANSON ETAL 3,101,150
TRACTOR SHOVEL MACHINE ADAPTED TO BE COMBINED WITH
A DETACHABLE CRANE OR PULL SHOVEL UNIT
Filed Dec. 6, 1960 6 Sheets-Sheet 4

INVENTORS
KARL ARVID JANSON
GUNNAR FREDRIK SUNDBERG
BY
*Albert M. Parker*
ATTORNEY

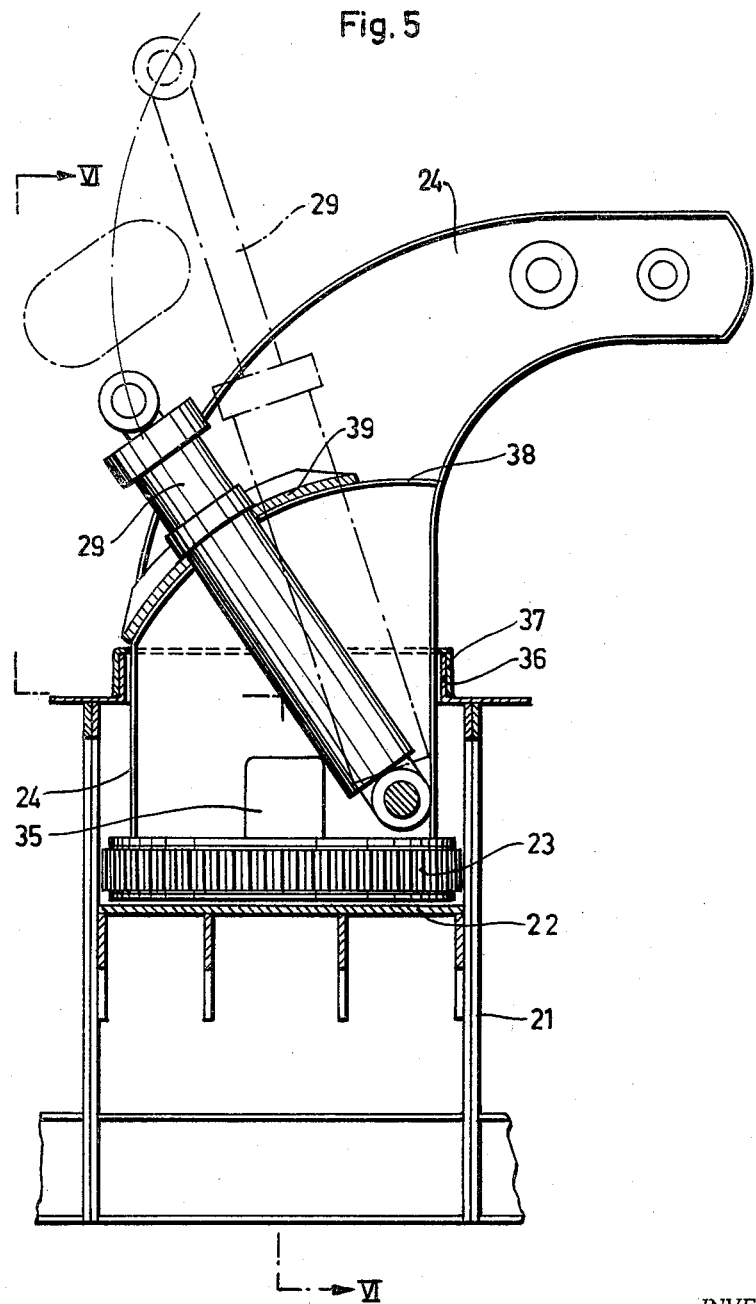

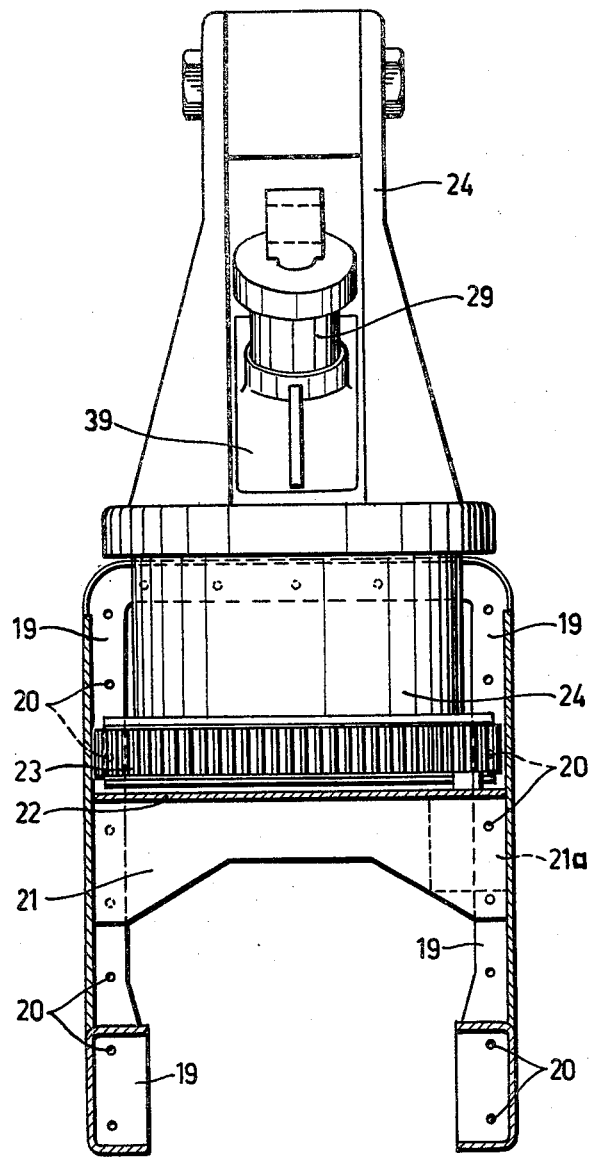

United States Patent Office 3,101,150
Patented Aug. 20, 1963

3,101,150
TRACTOR SHOVEL MACHINE ADAPTED TO BE COMBINED WITH A DETACHABLE CRANE OR PULL SHOVEL UNIT
Karl Arvid Janson, Landskrona, and Gunnar Fredrik Sundberg, Solna, Sweden, assignors to Aktiebolaget Landsverk, Landskrona, Sweden, a corporation of Sweden
Filed Dec. 6, 1960, Ser. No. 74,188
Claims priority, application Sweden Dec. 17, 1959
4 Claims. (Cl. 212—38)

The present invention relates to a tractor shovel machine adapted to be combined with a detachable crane or pull shovel unit and having a variable wheel base for its use for instance as a crane or pull shovel with large wheel base and a tractor shovel, fork truck etc. with small wheel base.

Tractor shovels carried on wheels have in the last few years been used to an increasing extent, for handling loose material such as gravel, blasted rocks, snow etc. These machines have large bucket volumes in relation to their weight, and consequently a comparatively large loading capacity. Another contributory reason for their increased use, in relation to crawler loading machines, is the relatively high driving speed which makes a direct transport of material possible over short distances. These tractor shovels often operate in very narrow spaces, providing very small turning radius. Since the turning radius is a function of the wheel base, i.e. the distance between the wheel axles of the machine, this distance must be as short as possible.

During the last few years a new type of tractor shovel machines has come into use. This machine substantially corresponds to machines of the previous type but in contradistinction thereto has a rotatable upper part supporting a crane, a pull shovel or the like. Said rotatable part may be rotated over 360° to enable operations around the whole machine. For said reason, the rotatable part must be fixed in the center of the machine or in the immediate vicinity thereof in order to obtain the necessary stability and therefore its wheel base must be longer than that of a tractor shovel machine.

It would evidently be of considerable advantage if said different auxiliary units could be combined with one and the same basic machine, in such a way that the short tractor shovel machine could be changed into a crane machine and an excavator respectively while maintaining the small turning circle radius for the first-mentioned purpose and a central mounting of the rotatable crane and the tractor shovel in the last-mentioned case.

The main purpose of the present invention is to provide a combined machine of this kind adapted to be separated in a cross plane between the wheel axles into a front section and a rear section, and means for detachably mounting an intermediate section, said front section carrying a front pair of wheels and said rear section carrying a rear pair of wheels.

According to the main feature of the invention said intermediate section comprises a frame with a stand or support for a crane or pull shovel unit and means for mounting said support pivotally in horizontal plane.

This intermediate section is provided with driving means to enable swinging or rotation of the support and further means comprising a hydraulic cylinder for the vertical motion of the units as well as a shaft for their rotatable mounting, all of said means being common for the auxiliary units to be attached to the rotatable support of the machine. Preferably, the support comprises connections to a hydraulic operating system.

Since the clutch-operating elements and the driving shaft of the machine are all fixed, they may readily be extended when inserting the intermediate section thereby providing for an unchanged rigidity of the extended machine.

One embodiment of the invention will hereinafter be described more in detail with reference to the accompanying drawings, in which FIG. 1 shows the machine separated into a front and a rear section and an intermediate section.

FIG. 5 shows a side view of the intermediate section and FIG. 6 a front view thereof.

Figure 1:
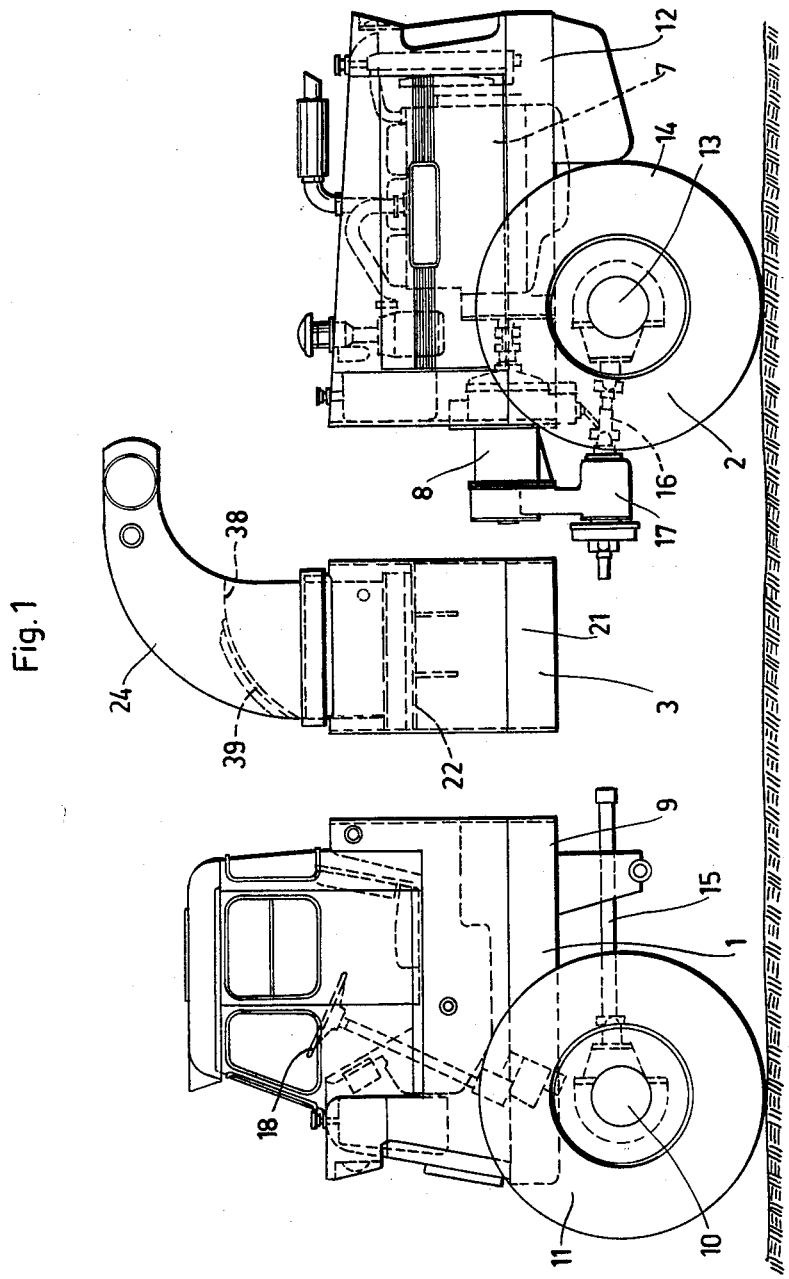

According to FIG. 1 the machine comprises a front section 1 with front wheels and the driver's cab, a rear section 2 with the rear wheels, the engine and the necessary power transmission means as well as an intermediate section 3 with a rotatable support. The front section 1 has a frame 9 (see FIG. 3) to the underside of which an axle with the two front wheels 11 is mounted. The rear section 2 has a corresponding frame 12, supported by an axle 13 and the two rear wheels 14. From a driving engine 7 and a gear box 8 the driving force is transmitted through the driving shafts 15 and 16 to differentials and planetary gears, mounted in the shafts 10 and 13 by means of which each of the wheels is driven. Through disconnecting means 17 the driving of the wheels may be disconnected. The machine is steered by a steering wheel 18 in the driver's cab, said wheel actuating the steering gear, connecting rod, steering worm, steering-gear arm and steering-gear links of the rear wheels 14. In the case when the machine is fitted with the intermediate section 3 the front wheels 11 may also be steerable.

Figure 3:
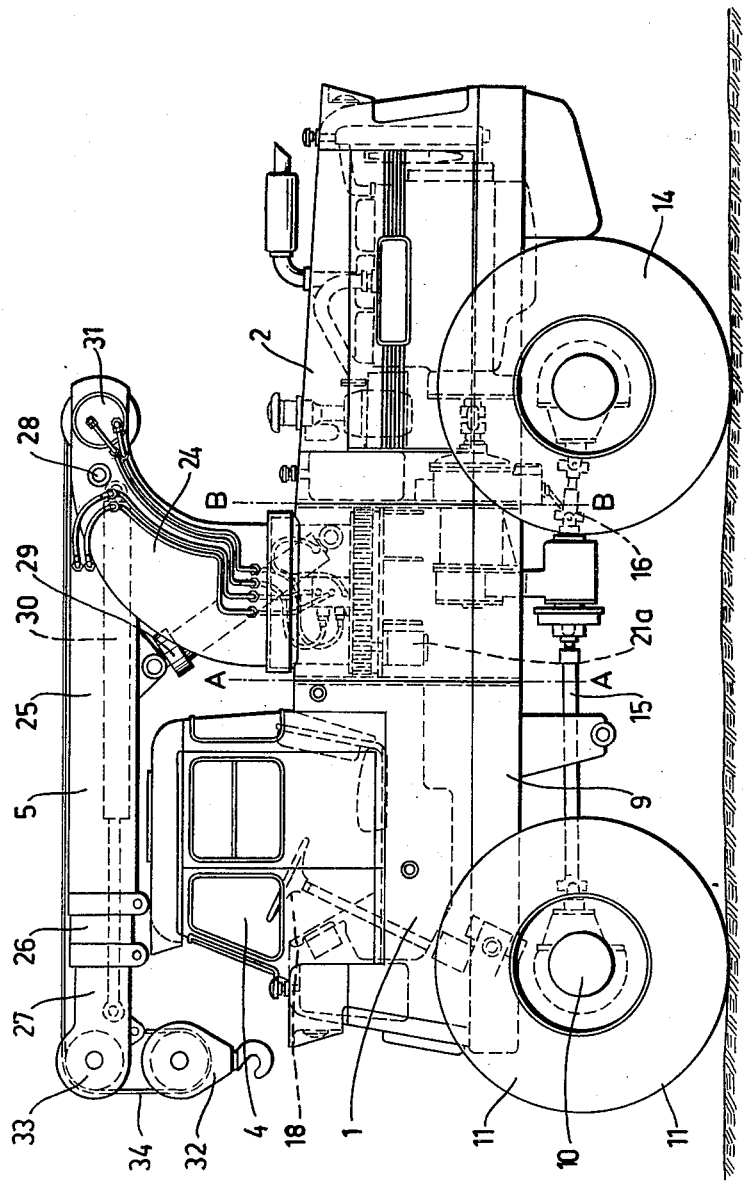
FIGS. 3 and 4 illustrate the machine with the intermediate section attached thereto and with a crane and a pull shovel respectively.

The separating surfaces A—A and B—B, FIG. 3, are uniform and provided with internal flanges 19 with cramp holes 20 so as to enable either of the sections 1 and 2 or sections 1, 2 and 3 to be connected with each other. The intermediate section 3 comprises a frame 21 with a horizontal base plate 22 at its lower part, said plate supporting a gear rim 23 with external teeth and journalled in ball-bearings. On the gear rim a stand or support 24 is mounted. The support 24 is rotatable by means of a motor 21a, FIG. 3, preferably of hydraulic type, and mounted in the frame 21, said motor co-operating with the gear rim 23, FIG. 5. The same support 24 as for the crane 5 is also used for the boom 6 according to FIGS. 3 and 4, said crane comprising a boom 25 with telescopically movable booms 26 and 27 mounted therein. The crane boom is journalled in the shaft 28 and may be raised or lowered by means of a hydraulic cylinder 29. The booms 26 and 27 are moved in and out by means of a hydraulic cylinder 30. At the rear end of the boom 25 a hydraulic driving motor 31 with a cable drum is mounted. A lifting cable 34 extends from the cable drum over the block 32 and the pulleys 33 to the boom 27.

Hydraulic fluid for the cylinders 29 and 30 and the hydraulic motor 31 is supplied from the main motor through connections in the center of the ball-bearing rim and therefrom through tubings to the various cylinders and the motor.

In order to reduce the total height of the machine while maintaining the desired lifting height the base plate 22, FIG. 1, is mounted relatively low in the frame 21 thereby ensuring the necessary length of the stroke of the cylinder 29, FIG. 3. In order to obtain sealing between the support 24, FIG. 1, and the frame 21 the latter is provided with a ring-shaped flange 36, FIG. 5, while the support has a ring-shaped flange 37 covering said first flange. In this way good sealing against rain, snow and solid particles is obtained. Sealing of the upper side of the support 24 is attained by means of a sealing plate 38 having a slit for the movable cylinder, said slit being covered by a plate 39 attached to said cylinder and being displaceable therewith.

Figure 4:
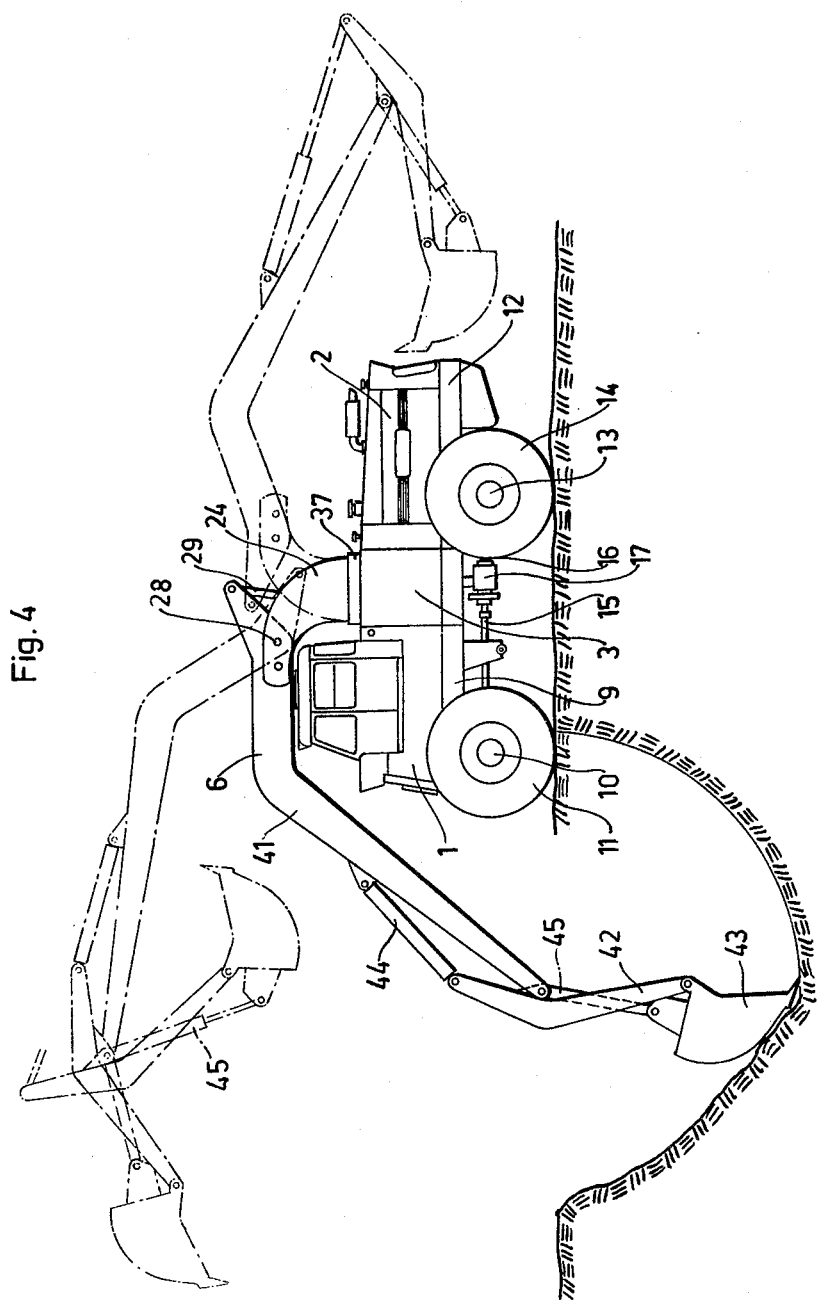

When the crane is to be changed into a pull shovel the crane parts 25, 26, 27, 30, 31, 32, 33 and 34 are exchanged for the parts shown in FIG. 4, i.e. boom 41, a bucket arm 42 and a bucket 43. The bucket arm is actuated by a cylinder 44, while the bucket is actuated by a cylinder 45. For the excavator the same support 24, cylinder 29 and driving motor are used as for the crane. The hydraulic conduits used for the crane are connected to the excavator as follows: the conduits for the hydraulic engine 31, FIG. 3, are connected to the cylinder 44 and the conduits for the hydraulic cylinder 30 are connected to the cylinder 45.

Figure 2:
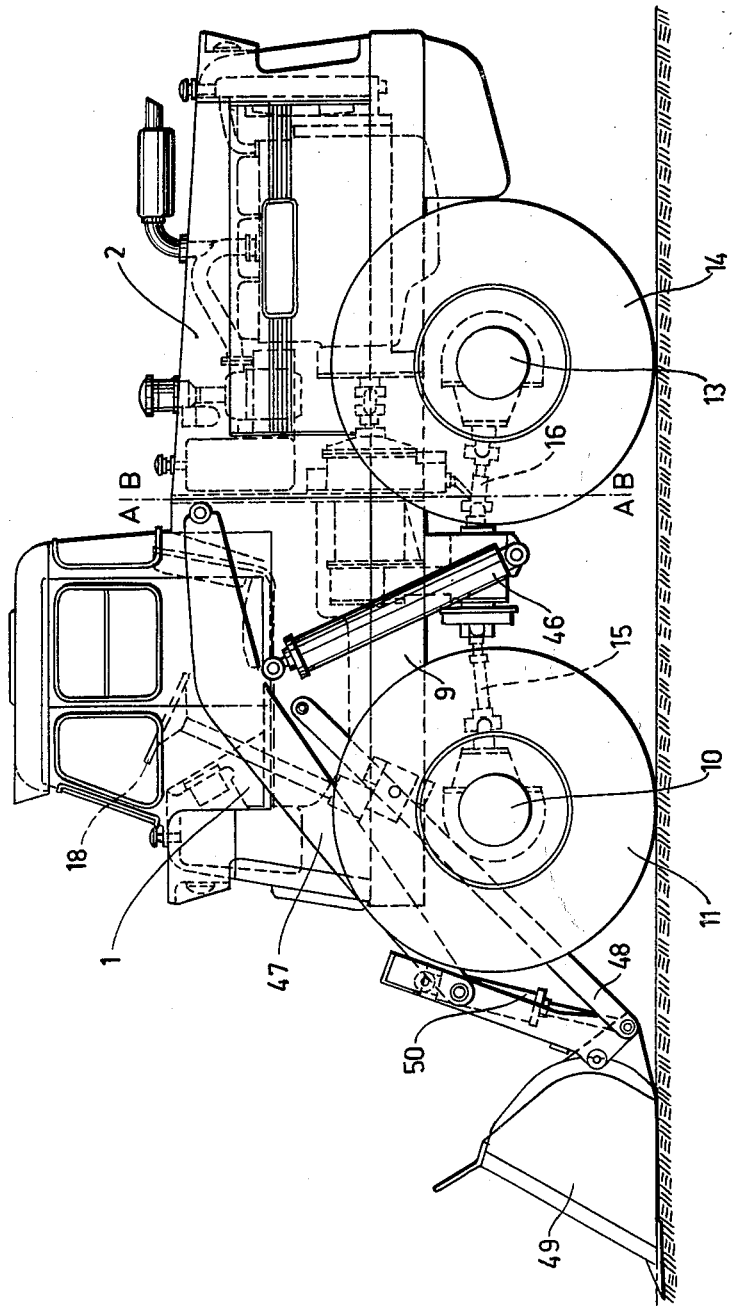
FIG. 2 shows the machine used as a tractor shovel machine without said intermediate section.

When the machine is to be used as a tractor shovel according to FIG. 2 the intermediate section 3 is detached and the unit comprising the boom 47, the lifting cylinder 46, the side bar 48, the bucket 49 and the bucket cylinders 50 are mounted to the front of the machine.

The hydraulic equipment which may be of any well-known type is preferably of such a type as to actuate the cylinders 46 and 50 as well as the crane according to FIG. 3 and the excavator according to FIG. 4 respectively. Further two or more separate hydraulic actuating means may be provided in order to allow a combination of the tractor shovel according to FIG. 2 and the crane according to FIG. 3.

Other equipments such as dozer, snow plow, grab, fork etc. may be used in connection with the embodiment according to FIG. 2.

What we claim is:

1. In a load handling vehicle, a rear section, a front section and an intermediate section between said rear section and said front section, means for detachably clamping said sections together to form a single unit, load handling means mounted on said intermediate section, said load handling means comprising a support projecting from the upper side of said intermediate section, said support being rotatably mounted about a vertical shaft, an engine for imparting a rotary movement to said support, a load handling arm pivoted to the upper end of said support so as to be swingable about a horizontal axis, load carrying means connected to the free end of said load handling arm, an engine in said rear section for driving said vehicle, driving wheels mounted underneath said rear section, clutch means for connecting said engine to said rear driving wheels, said clutch means serving for connecting said engine to a forwardly projecting horizontal shaft, an extension shaft connected at one end thereof to the free end of said horizontal shaft, driving wheels mounted underneath said front section, means connecting the other end of said extension shaft to said front driving wheels and steering means in said front section for rotating said driving wheels of said front section about a vertical axis.

2. In a load handling vehicle a rear section, a front section and an intermediate section between said rear section and said front section, means for detachably clamping said sections together to form a single unit, load handling means mounted on said intermediate section, said load handling means comprising a support projecting from the upper side of said intermediate section, means for mounting said support for rotatable movement about a vertical shaft, an engine for imparting a rotary movement to said support, a load handling arm and means for pivoting said arm to the upper end of said support so as to be swingable about a horizontal axis, load carrying means connected to the free end of said load handling arm said load handling means comprising a bucket arm pivoted to said load handling arm and an excavating bucket pivotally connected to said bucket arm, and hydraulic driving means for moving said bucket arm and said bucket, an engine in said rear section for driving said vehicle, driving wheels mounted underneath said rear section, clutch means for connecting said engine to said rear driving wheels, said clutch means serving for connecting said engine to a forwardly projecting shaft, an extension shaft connected at one end thereof to the free end of said horizontal shaft, driving wheels mounted underneath said front section, means connecting the other end of said extension shaft to said front driving wheels and steering means in said front section for rotating said driving wheels of said front section about a vertical axis.

3. In a load handling vehicle, a rear section, a front section and an intermediate section between said rear section and said front section, means for detachably clamping said section together to form a single unit, load handling means mounted on said intermediate section, said load handling means comprising a support projecting from the upper side of said intermediate section, said support being rotatably mounted about a vertical shaft, an engine for imparting a rotary movement to said support, a load handling arm pivoted to the upper end of said support so as to be swingable about a horizontal axis, load carrying means connected to the free end of said load handling arm said load handling means comprising a crane arm mounted in said load handling arm means for extending said crane in the longitudinal direction thereof, a pulley at the free end of said crane arm, a block with a crane hook hanging under said pulley and a lifting cable running from a fix point on said crane arm, through said block, over said pulley and to a lifting engine mounted at the pivoted end of said load handling arm, an engine in said rear section for driving said vehicle, driving wheels mounted underneath said rear section, clutch means for connecting said engine to said rear driving wheels, said clutch means serving for connecting said engine to a forwardly projecting shaft, an extension shaft connected at one end thereof to the free end of said horizontal shaft, driving wheels mounted underneath said front section, means connecting the other end of said extension shaft to said front driving wheels and steering means in said front section for rotating said driving wheels of said front section about a vertical axis.

4. An articulated vehicle for the inclusion of materials handling apparatus as part thereof, which vehicle comprises a rear section, a pair of wheels mounted beneath said rear section and supporting the same, a driving engine for said vehicle carried by said rear section, a front section and a pair of wheels mounted beneath said front section for supporting the same, means for the separable engagement of said front and rear sections formed for the inclusion therebetween said sections and joining therewith of an intermediate section supporting materials handling apparatus on separation of said front and rear sections from each other, means operatively engaged by said engine for driving both of said sets of wheels in separated as well as engaged relationship of said front and rear sections and steering means carried by said front sections, means included in the mounting means for both of said pairs of wheels providing for the steering of all of said wheels and means operatively interconnecting with said means providing steering for enabling the steering of all of said wheels by said steering means.

References Cited in the file of this patent
UNITED STATES PATENTS

| | | |
|---|---|---|
| 2,425,948 | Lucien | Aug. 19, 1947 |
| 2,787,383 | Antos et al. | Apr. 2, 1957 |
| 2,792,138 | Olson | May 14, 1957 |
| 2,986,292 | Kampert et al. | May 30, 1961 |